United States Patent [19]
Dumbrill

[11] Patent Number: 5,907,424
[45] Date of Patent: May 25, 1999

[54] ROTATING MIRRORS

[75] Inventor: Dean K N Dumbrill, Bournemouth, United Kingdom

[73] Assignee: Westwind Air Bearings Ltd., Dorst, United Kingdom

[21] Appl. No.: 09/050,968

[22] Filed: Mar. 31, 1998

[30] Foreign Application Priority Data

Apr. 3, 1997 [GB] United Kingdom .................. 9706771

[51] Int. Cl.⁶ ................................................ G02B 26/08
[52] U.S. Cl. ........................ 359/217; 359/216; 359/855; 359/871
[58] Field of Search ..................... 359/196, 197, 359/212, 216, 217, 218, 219, 850, 855, 871

[56] References Cited

U.S. PATENT DOCUMENTS 5,359,460 10/1994 Urakawa .................................. 359/855
5,675,430 10/1997 Ishizuka et al. ......................... 359/216

FOREIGN PATENT DOCUMENTS 214 222 10/1984 Germany ................................. 359/216

Primary Examiner—Cassandra Spyrou
Assistant Examiner—Darren E. Schuberg
Attorney, Agent, or Firm—Nixon & Vanderhye P.C.

[57] ABSTRACT

Rotating mirrors and methods for producing rotating mirrors with reduced variation in centrifugal distortion are disclosed. Pins (52) having a density different from that of the remainder of the body (51) of a rotating mirror are provided and located to reduce variation in centrifugal distortion when the mirror is rotated at high speed.

7 Claims, 7 Drawing Sheets

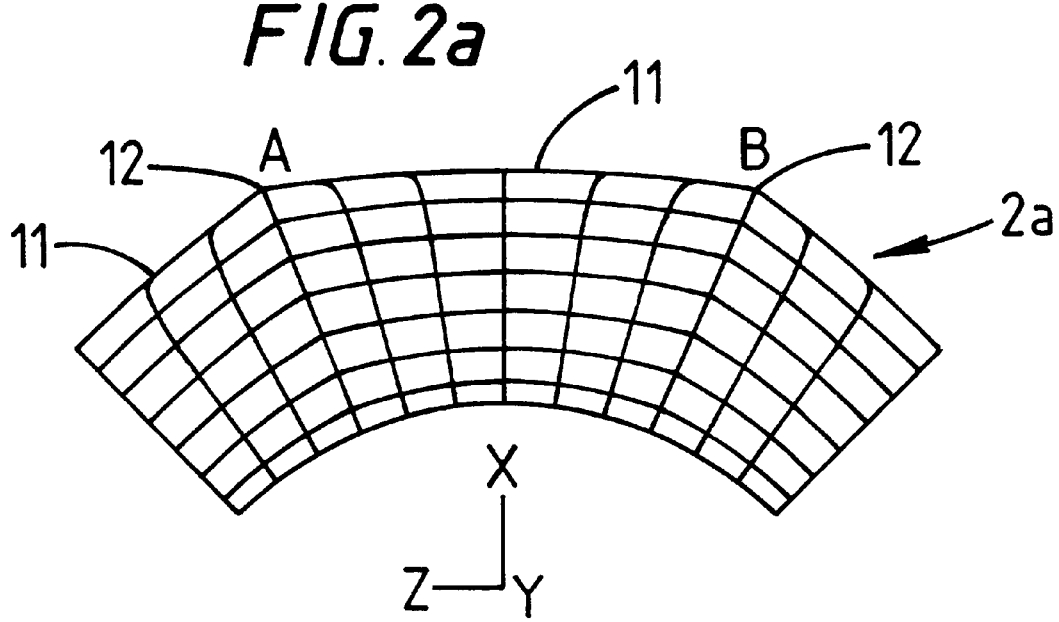
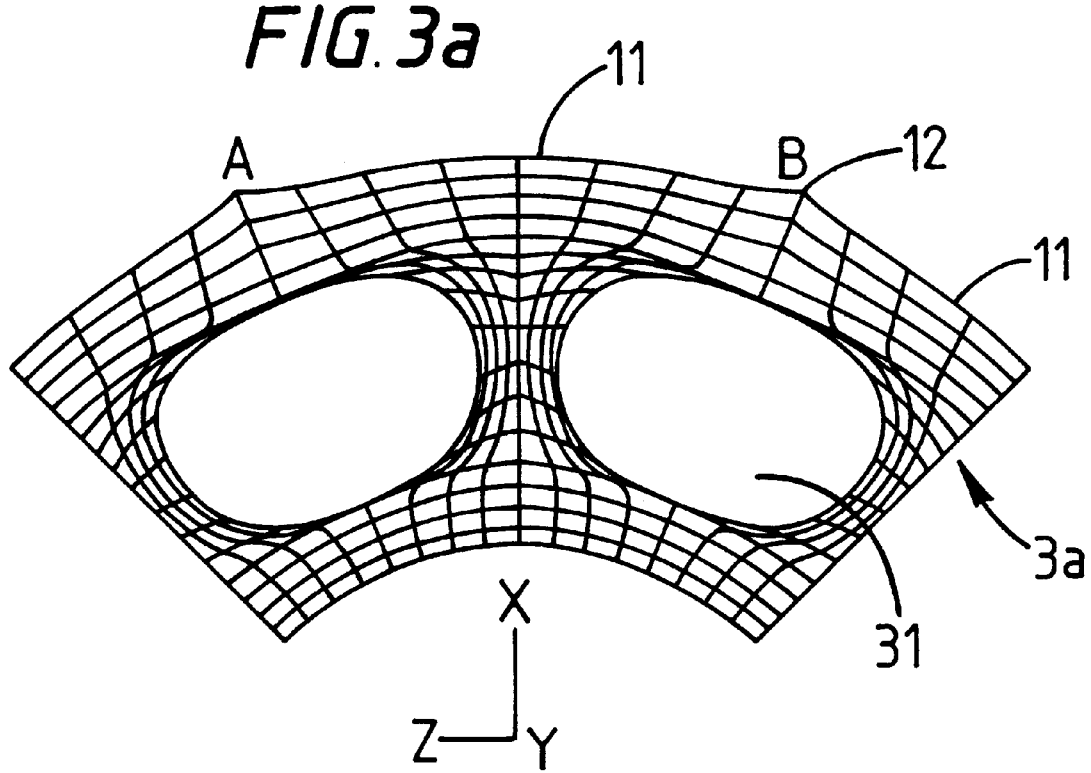

ROTATING MIRRORS

IMPROVEMENTS IN ROTATING MIRRORS

This invention relates to improvements in rotating mirrors. Particularly it relates to a method of reducing facet deformation in rotating polygons and to rotating polygons arranged in such a way as to reduce the facet deformation thereof.

In the field of optical scanning the use of polygonal mirrors which must be rotated at high speeds is common. In order to achieve a high standard of optical performance, the flatness of the polygon facets is of great importance. It is possible to form polygons having very high standards of optical flatness during manufacture but when such polygons are rotated at high speed they can suffer deformation. In particular, when being rotated at high speeds, the polygon is likely to become distorted in such a way that the optical flatness of the facets decreases. Further, the higher the speed of rotation used the worse the distortion exhibited by the mirror.

Such polygonal mirrors are usually formed from a rotary carrier in the form of a solid block of metal, in which peripheral surfaces of the block are highly polished to form the optical facets.

In this specification we use the term cylinder in its broad sense as being a figure of uniform cross-section generated by a straight line remaining parallel to a fixed axis and moving around a closed curve. Of course, the cylinder does not need to be solid—it can be hollow—nor does it need to be circular and in most cases herein will be polygonal.

When a polygonal cylinder is rotated at high speed the whole of the polygonal surface will tend to deform outwards due to centrifugal force. However, the amount of outward deformation of the polygonal surface is not equal over the whole of the surface. At first sight it would appear that the corners of the polygonal surface, ie the portions where the adjoining facets meet, will deform outwards more than the centre of each of the facets. This is based on the supposition that the corners are at a greater radius, and so are subject to greater centrifugal forces. The result of this would produce facets having a concave shape.

However, finite element analysis carried out by the applicant, has shown that in fact, when a polygonal cylinder is rotated at high speed it will tend towards a circular form due to other factors coming in to play. This can be explained as being due to generation of a high circumferential (hoop) stress, and also to the geometry of the material resisting deformation. The net result of this is that when a polygonal cylinder is rotated at high speed about its axis the facets take on a convex shape.

Further analysis has shown that the deformation suffered by each of the facets can be altered by varying the density and/or mass distribution within the polygonal cylinder.

Referring to FIG. 1, an octagonal cylindrical mirror 1 generally comprises eight optically flat reflecting facets 11, a top octagonal surface 13 and a bottom octagonal surface 14 and is arranged to be rotated about a central longitudinal axis C. Where each pair of adjacent facets 11 meet, a longitudinal edge 12 is formed. In FIG. 1, two longitudinal edges 12 of one of the facets 11 are labelled A and B and these labels are referred to in the other Figures. Each of the mirrors 2a, 3a, 4a and 5a described hereinafter have the same general structure described above but mirrors 3a, 4a and 5a include various modifications.

FIGS. 2a and 2b show the distortion suffered by an octagonal cylindrical mirror 2a having uniform density when rotated at high speed. FIG. 2a shows the deformation pictorially and defines a set of orthogonal axes X, Y and Z. FIG. 2b is a graph showing the dynamic deformation of a facet produced in the X-direction due to the rotation of the mirror 2a. As shown in the graph in FIG. 2b, the maximum deformation occurs in the centre of each facet and the minimum at the two edges A, B of each facet. Thus the facets take on a convex shape. The difference in deformation between the centre of the facet and the two edges A, B of the facet ($\Delta x$) is approximately $130 \times 10^{-9}$ meters.

FIGS. 3a and 3b show the deformation of the facets 11 of a similar octagonal mirror 3a but in which eight holes 31 are provided beneath the edges 12 formed by the adjacent facets 11 of the polygonal surface. Each of the holes 31 is disposed on a line between the central axis C and a respective edge 12 of the mirror 3a and has a cylindrical shape of circular cross-section when the mirror 3a is stationary. However, when the mirror 3a is rotating at high speed each of the holes 31 deforms from the circular shape. The longitudinal axis of each hole 31 is parallel to the central axis C of the mirror and each hole 31 is formed right through the mirror 3a from the top surface 13 to the bottom surface 14. With such a mirror 3a, compared to the mirror 2a shown in FIG. 2a, the overall deformation of the facets 11 is increased and the variation in deformation across the width of the facet is also greater. Analysis shows that the convex facet profile is worsened by the provision of the holes 31. As shown in the graph in FIG. 3b, the difference in deformation of the centre of the facet compared with each of the edges A, B ($\Delta x$) is approximately $450 \times 10^{-9}$ meters.

The general arrangement of a third octagonal mirror 4a is similar to that of the mirror 1 described with reference to FIG. 1.

The particular features of the third mirror 4a will now be described with reference to FIG. 4a. A carrier 41 of the third mirror 4a is formed so as to define eight voids 42 (only some of which are shown in FIG. 4a). When the third mirror 4a is stationary each of the voids 42, defined by the carrier 41, is shaped as a cylinder having a circular cross-section, the axis of the cylinder being generally parallel to the longitudinal axis C of the third mirror 4a. However, when the third mirror 4a is rotated at high speed, each of the voids 42 is deformed from the circular shape and takes on an oval cross-section. The carrier 41 is formed so that one void 42 is associated with each of the 8 facets 11. Each of the voids 42 is provided through the whole longitudinal length of the third mirror 4a, from the top surface 13 to the bottom surface 14, and is provided centrally with respect to the respective facet 11.

The carrier 41 can be defined as having a generally cylindrical central solid core portion 411, an outer annular portion 412 and eight web portions 413 which join an outer surface of the core portion 411 to an inner surface of the annular portion 412.

A set of orthogonal axes X, Y, Z is defined in FIG. 4a, relative to a particular facet 11, the edges 12 of which are labelled A and B. The X-direction is defined to be perpendicular to the plane of the particular facet 11.

In the graph in FIG. 4b, the displacement in the X-direction of the particular facet 11 caused by the rotation of the third mirror 4a is plotted on the Y axis against the position along the facet 11 between the edges A and B on the X axis. The points marked A and B on the graph in FIG. 4b correspond to the edges A and B of the particular facet 11. As shown in the graph in FIG. 4b, the variation in dynamic displacement of the facet 11 in the X-direction caused by rotating the mirror at high speed (Δx) is approximately 80×10$^{-9}$ meters. The facet 11 of the third mirror 4a does not exhibit a simple convex or concave shape, but rather a sinusoidal shape as depicted in the graph of FIG. 4b.

Obviously these results are equally applicable to each facet 11 of the mirror 4a.

EP 0 453 144 A discloses the idea of modifying the weight density of a rotating polygon by providing axial holes centrally to the polygon facets to reduce distortion. However, the provision of axial holes can cause problems due to increased air resistance and noise. Axial holes may cause further difficulties for example in applying a suitable finish or cause a variability in performance due to dirt accumulating in the holes. The accumulation of dirt might necessitate cleaning.

It is an object of the present invention to provide an improved configuration for rotating polygonal mirrors such that the variation in surface deformation of the facets of the mirror can be minimised and the disadvantages of forming holes in the body of the polygon can be avoided.

According to the present invention there is provided a rotary mirror comprising a rotary carrier having a plurality of mirror surfaces arranged around a periphery of said carrier, and the carrier having an average overall density except in selected regions whose density is different from the overall density and which selected regions are located and shaped to reduce spatial variation in any centrifugal distortion of the periphery of the carrier when the carrier is rotated wherein the different density regions are provided by the introduction of a material at selected regions within the carrier.

In this specification the introduction of a material means physically introducing a material into the carrier and does not cover merely providing a hole or void. Arranging the mirror so that it has an imperforate outer surface is desirable because it can minimize the problems associated with forming holes in the carrier. Introducing material into the carrier can allow an imperforate surface to be maintained. The material introduced may be more or less dense than the material of the carrier.

Preferably, the different density regions are provided by inclusion of higher density material at said regions.

Preferably said mirror surfaces are arranged in the form of a regular polygon.

Combinations of high density, low density and void spaces can also be used, and the density can be at different values in different regions if required.

Said carrier can be in the shape of a cylinder of polygonal cross-section having a central axis of rotation and having cylindrical regions of different density lying parallel to said central axis of rotation.

Said polygonal cross-section can have the form of a regular polygon.

Said cylindrical regions of different density can have a circular cross-section, an elliptical cross-section, an oval cross-section, a polygonal cross-section or any other suitable cross-section.

Generally there will be a defined peripheral vertex between each successive mirror surface and preferably each region of higher density material is disposed, at least in part, on a radial line between said central axis and said defined peripheral vertex.

Preferably a pin or an insert of high density relative to the carrier is associated with each edge or vertex of the carrier. Said pin or insert will preferably have a longitudinal axis which is parallel to the central axis of rotation of the mirror.

Said mirror carrier can be a polished block of metal, for example aluminium.

According to a particular embodiment of the present invention there is provided a regular polygonal cylindrical carrier arranged to be rotated about its longitudinal axis and comprising a main carrier of one material and a plurality of inserted pins having a density greater than that of said one material, each pin being disposed on a line between said longitudinal axis and a respective edge of the carrier and having an axis parallel to said longitudinal axis.

Mirrors according to the present invention have the advantage that distortion can be minimised and the formation of holes can be avoided. Moreover the regions of high density and/or low density are provided to reduce distortion and give the additional advantage of minimising drag and/or noise without the need for additional components. A further advantage is that a greater degree of flexibility is obtained because the regions of different density can be chosen to have a particular density. This might be close to or very different from that of the remainder of the body. Further, the regions of different density need not have a common density.

An embodiment of the present invention will now be described, by way of example, with reference to the accompanying drawings, in which:

FIG. 2a is a fragmentary sectional view of a first octagonal mirror, showing the deformation which it experiences when rotated at high speed;

FIG. 2b is a graph showing the deformation of the first mirror as shown in FIG. 2a;

FIG. 3a is a fragmentary sectional view of a second octagonal mirror having holes beneath each edge, showing the deformation of the mirror when rotated at high speed;

FIG. 3b is a graph showing the deformation of the second mirror as shown in FIG. 3a;

FIG. 4b is a graph showing the deformation of the third mirror as shown in FIG. 4a;

FIG. 5b is a graph showing the deformation of the mirror as shown in FIG. 5a.

Figure 1:
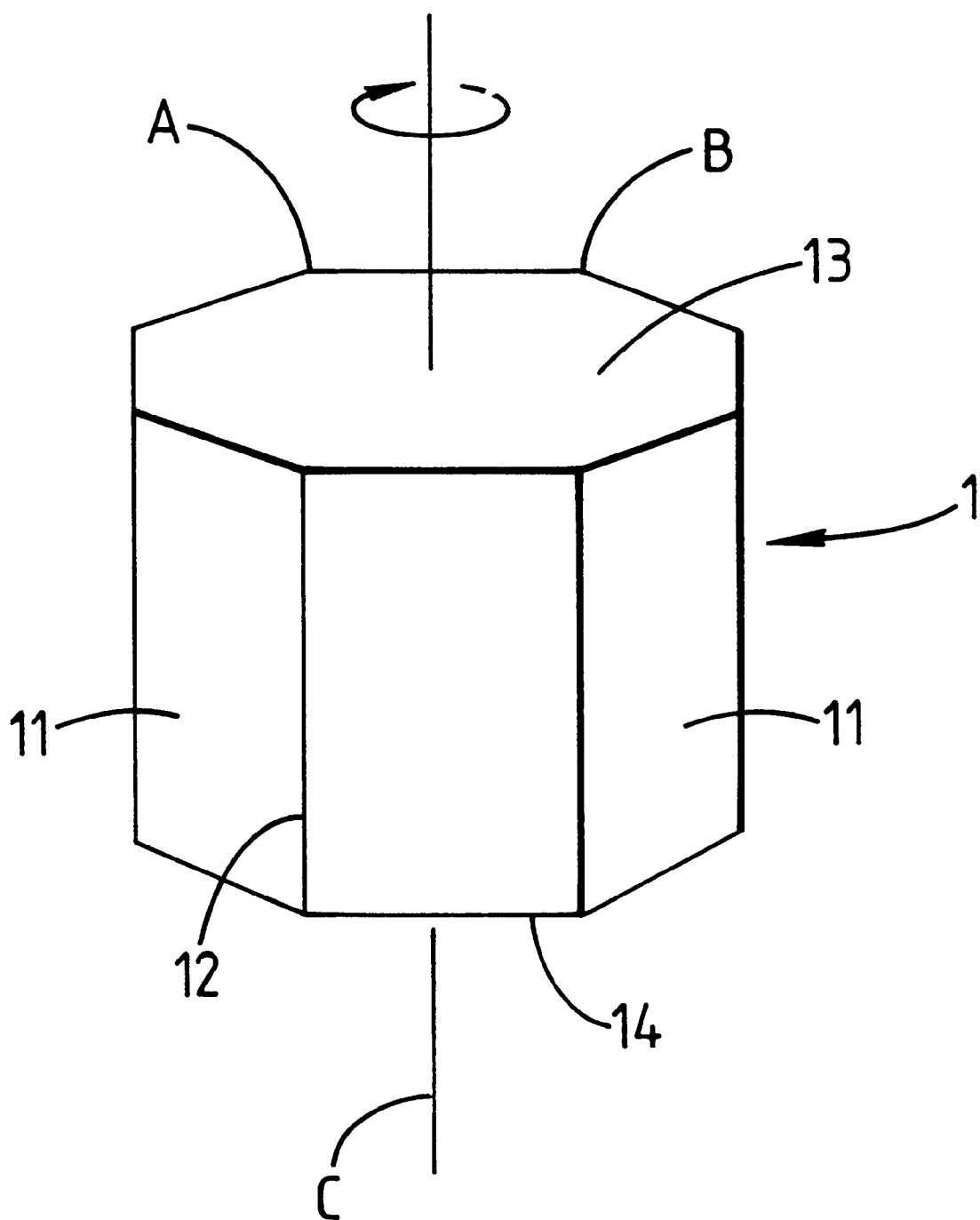
FIG. 1 is a perspective view of the general structure of an octagonal mirror.
Figure 2B:
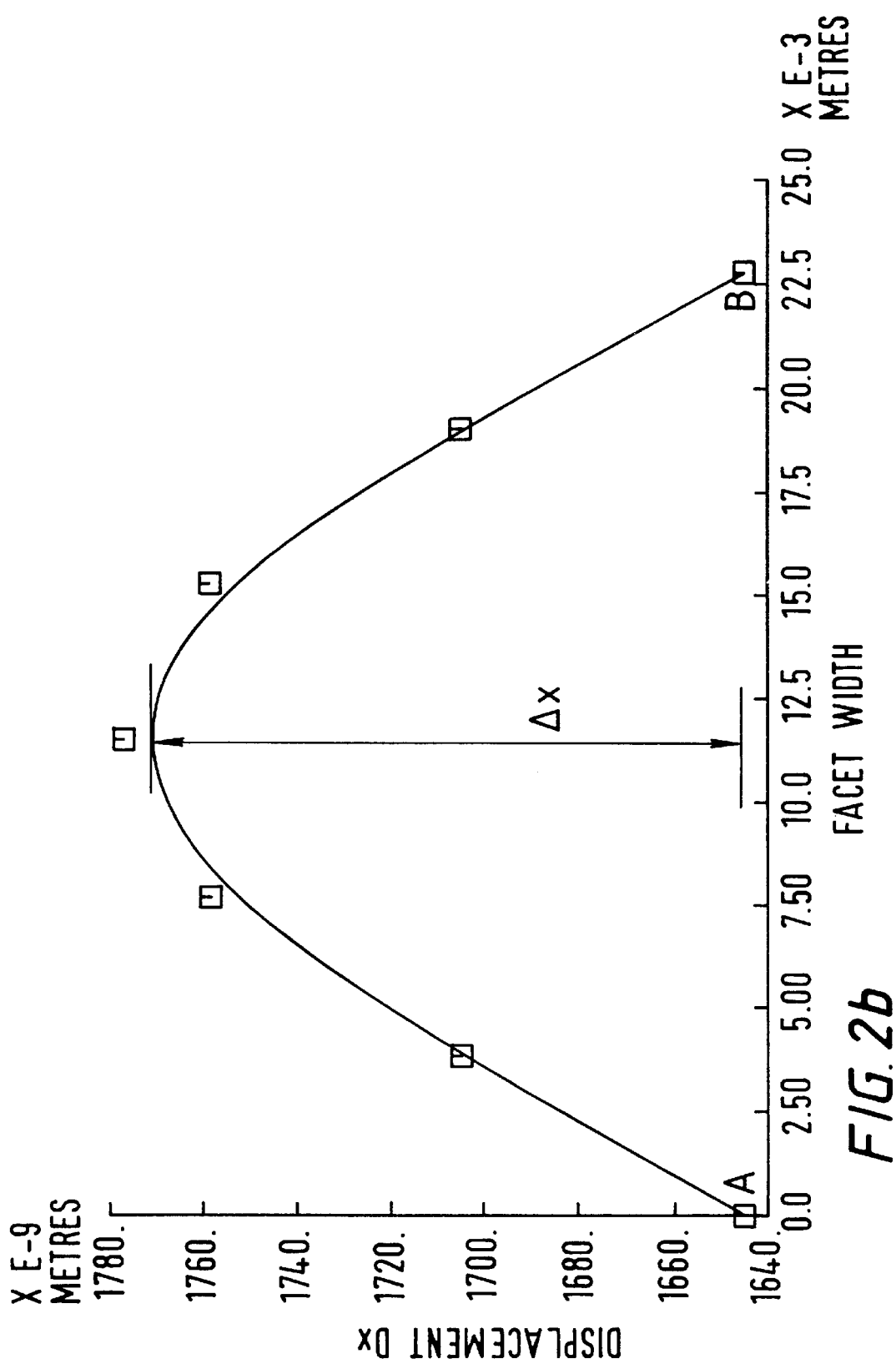
Figure 3B:
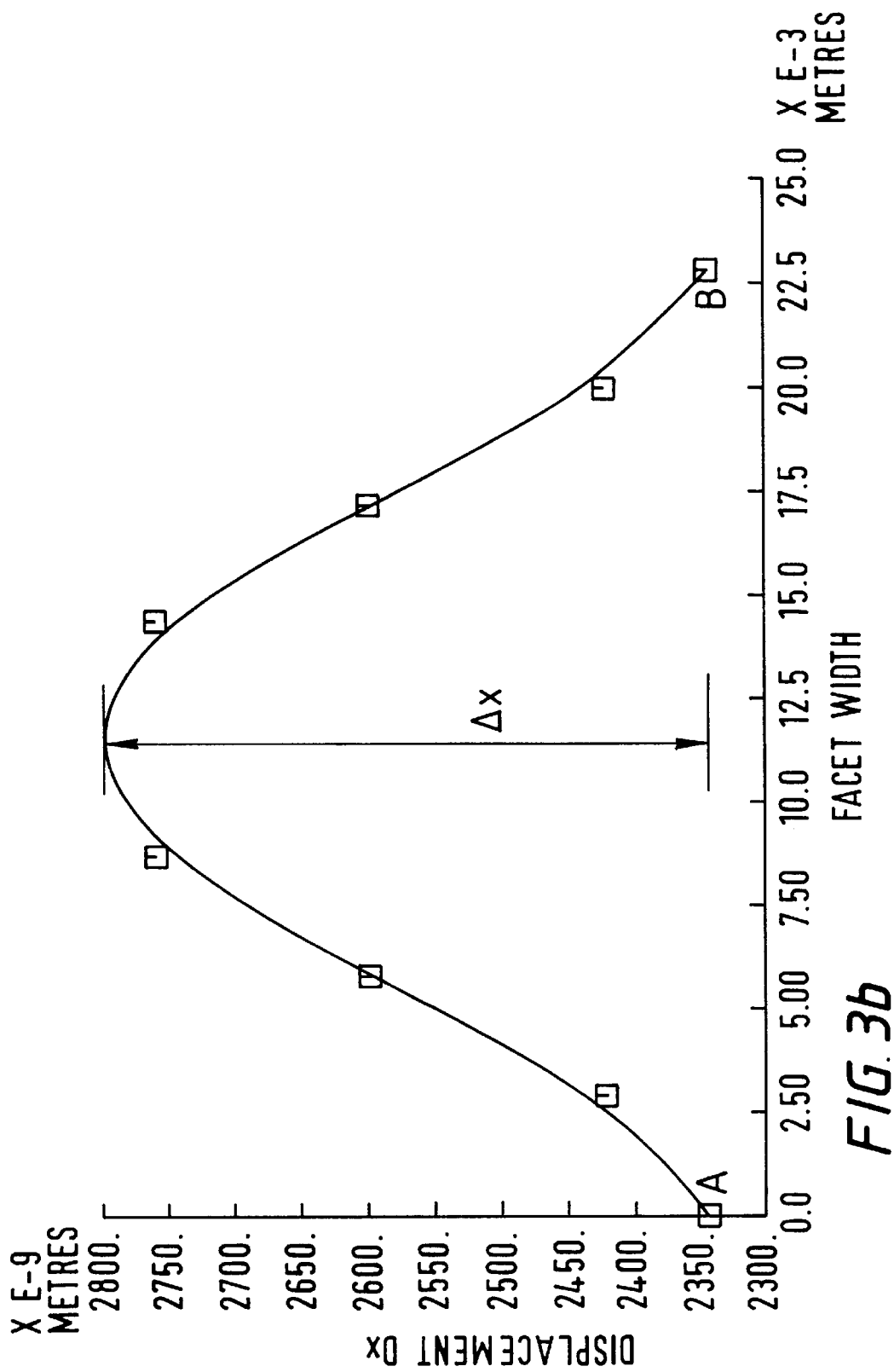
Figure 4A:
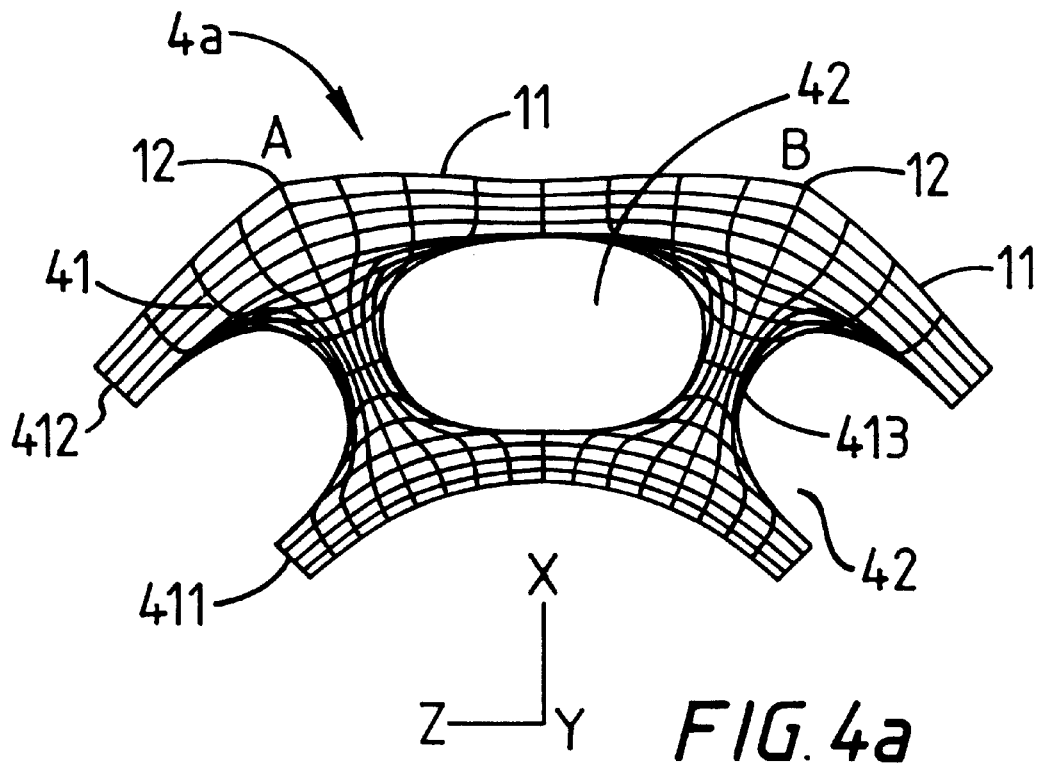
FIG. 4a is a fragmentary sectional view of a third octagonal mirror showing the deformation of the mirror when rotated at high speed.

An octagonal cylindrical mirror 5a of an embodiment of the invention, has the same general configuration as the mirror 1 described with reference to FIG. 1.

The particular features of the mirror 5a will now be described with reference to FIG. 5a. A carrier 51 of the mirror 5a comprises an octagonal cylinder of a first material having a density $d_1$. The mirror 5a carries 8 inserted pins 52 which are located in holes 53 provided in the carrier 51. The pins 52 are formed of a second material having a density $d_2$, said density $d_2$ being greater than the density $d_1$ of the carrier 51.

Each of the pins 52 is cylindrical with a circular cross-section and is disposed so that the longitudinal axis of each pin 52 is aligned to the longitudinal axis C of the mirror 5a. The axis of each pin 52 is disposed on a line between the longitudinal axis C and a respective edge 12 of the mirror 5a. Each pin 52 is spaced inwardly from the respective edge 12.

The size, position and density of the pins 52 can be selected so that distortion of the facets 11 is minimised.

Figure 5A:
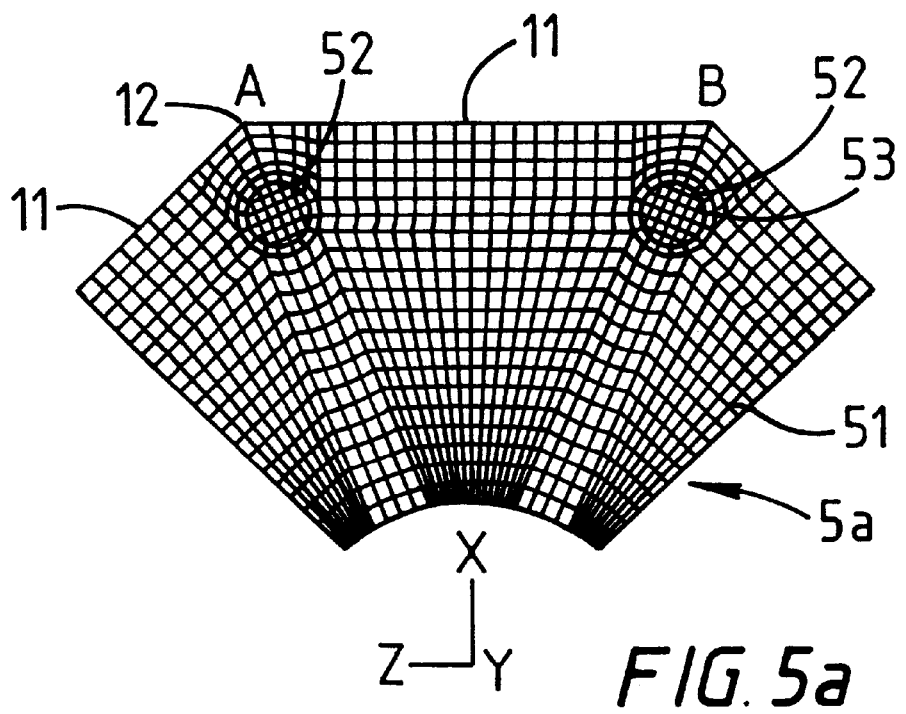
FIG. 5a is a fragmentary sectional view of a mirror of an embodiment of the present invention showing the deformation of the mirror when rotated at high speed.

A set of orthogonal axes X, Y, Z is defined in FIG. 5a, relative to a particular facet 11, the edges 12 of which are labelled A and B. The X-direction is defined to be perpendicular to the plane of the particular facet 11.

Figure 4B:
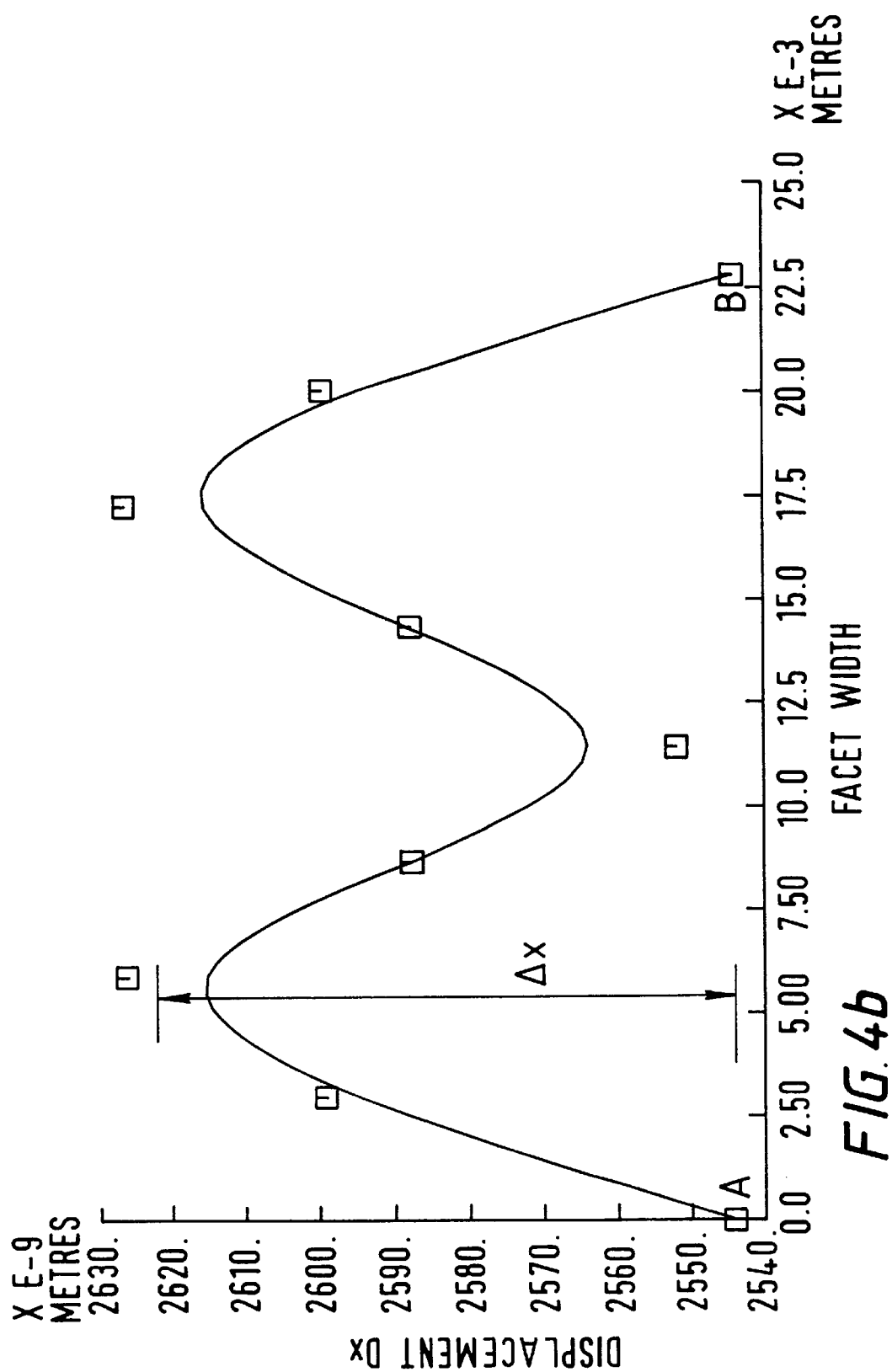
Figure 5B:
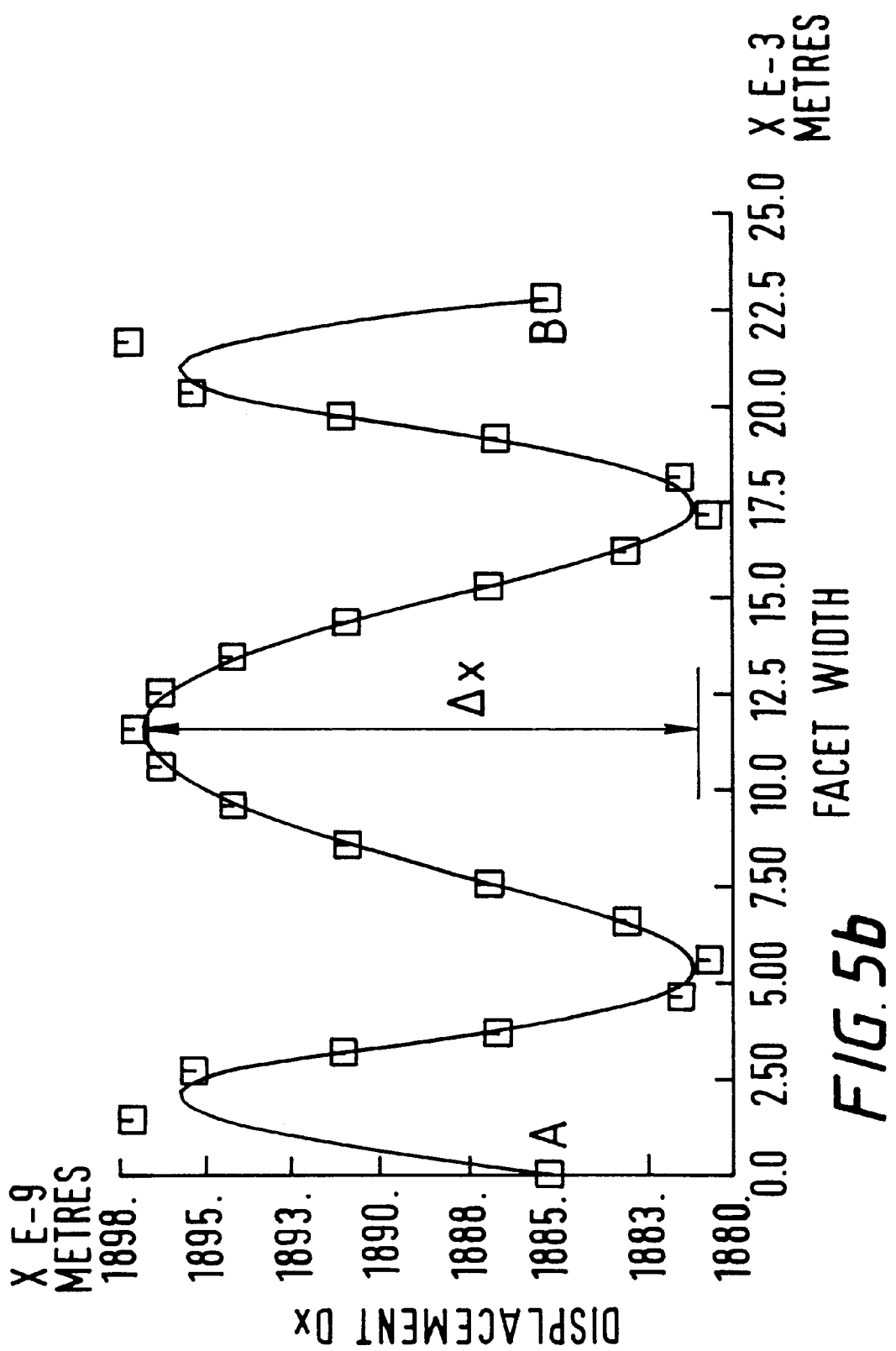

In the graph in FIG. 5b, the displacement in the X-direction of the particular facet 11 caused by the rotation of the mirror 5a is plotted on the Y axis against the position along the facet 11 between the edges A and B on the X axis. The points marked A and B on the graph in FIG. 5b correspond to the edges A and B of the facet 11. As shown in the graph in FIG. 5b, the variation in dynamic displacement of the facet 11 in the X-direction caused by rotating the mirror at high speed ($\Delta x$) is approximately $15 \times 10^{-9}$ meters. This is significantly less than the equivalent quantity exhibited by the third mirror 4a as shown in FIG. 4b. The facet 11 of the mirror 5a does not exhibit a simple convex or concave shape, but rather a sinusoidal shape as depicted in the graph of FIG. 5b.

Obviously these results are equally applicable to each facet 11 of the mirror 5a.

The carrier 51 of the mirror 5a can be constructed from any suitable material, for example, aluminium. The pins 52 may be constructed from any suitable material which is more dense than that of the carrier 51. If the carrier 51 is of aluminium then the pins 52 can be of steel.

The mirror 5a may be of any suitable size, for example 55 mm A/F. Further, the mirror, 5a may be of any suitable shape and have greater or fewer than eight facets.

The data shown in the graphs of FIGS. 2b–5b all relate to mirrors having an aluminium carrier and the same dimensions and being rotated at the same constant speed of 27,000 RPM.

In an alternative the pins need not have a circular cross-section and can be of any suitable shape. Each pin can be shaped as a polygonal cylinder.

In an alternative embodiment a mirror can be generally similar to the third mirror 4a. However, rather than having voids provided centrally to the facets, lower density material is introduced and located centrally to the facets. The lower density material is shaped and located so as to minimise variation in centrifugal distortion. It will be understood that lower density material means a lower density than that of the carrier material.

I claim:

1. A rotary mirror comprising a rotary carrier having a plurality of mirror surfaces arranged around a periphery of said carrier, and the carrier having an average overall density except in selected regions whose density is different from the overall density and which selected regions are located and shaped to reduce spatial variation in any centrifugal distortion of the periphery of the carrier when the carrier is rotated wherein the different density regions are provided by the introduction of a material at selected regions within the carrier.

2. A rotary mirror according to claim 1 in which the different density regions are provided by inclusion of higher density material at the selected regions within the carrier.

3. A rotary mirror according to claim 1 in which said mirror surfaces are arranged in the form of a regular polygon.

4. A rotary mirror according to claim 1 in which there is a defined peripheral vertex between each successive mirror surface and each region of higher density material is disposed, at least in part, on a radial line between an axis of rotation of said mirror and said defined peripheral vertex.

5. A rotary mirror according to claim 1 in which the carrier is in the shape of a cylinder of polygonal cross-section having a central axis of rotation.

6. A rotary mirror according to claim 5 which has regions of different density lying parallel to said central axis of rotation.

7. A rotary mirror according to claim 5 which has cylindrical regions of different density lying parallel to said central axis of rotation.

* * * * *